United States Patent
Kumamoto et al.

(10) Patent No.: US 11,499,064 B2
(45) Date of Patent: Nov. 15, 2022

(54) INK JET RECORDING APPARATUS, INK JET RECORDING METHOD, AND INK COMPOSITION

(71) Applicant: Seiko Epson Corporation, Tokyo (JP)

(72) Inventors: Kiyomi Kumamoto, Shiojiri (JP); Yusuke Mizutaki, Shiojiri (JP); Jun Ito, Shimosuwa (JP); Tomohiro Aruga, Matsumoto (JP); Tomoki Maruyama, Matsumoto (JP)

(73) Assignee: SEIKO EPSON CORPORATION

( * ) Notice: Subject to any disclaimer, the term of this patent is extended or adjusted under 35 U.S.C. 154(b) by 0 days.

(21) Appl. No.: 17/035,940

(22) Filed: Sep. 29, 2020

(65) Prior Publication Data
US 2021/0095149 A1 Apr. 1, 2021

(30) Foreign Application Priority Data
Sep. 30, 2019 (JP) .............................. JP2019-179753

(51) Int. Cl.
*B41J 2/195* (2006.01)
*C09D 11/328* (2014.01)

(52) U.S. Cl.
CPC ............. *C09D 11/328* (2013.01); *B41J 2/195* (2013.01)

(58) Field of Classification Search
CPC ............... B41J 2/17506; B41J 2/17509; B41J 2/17513; B41J 2/17523; B41J 2/17553; B41J 2/195; C09D 11/322; C09D 11/328
See application file for complete search history.

(56) References Cited

U.S. PATENT DOCUMENTS

| | | |
|---|---|---|
| 5,619,239 A | 4/1997 | Kotaki et al. |
| 5,745,137 A | 4/1998 | Scheffelin et al. |
| 5,746,818 A * | 5/1998 | Yatake .................. C09D 11/30 |
| | | 106/31.89 |
| 6,070,974 A | 6/2000 | Kotaki et al. |
| 6,145,975 A | 11/2000 | Kotaki et al. |
| 6,164,772 A | 12/2000 | Koitabashi et al. |
| 6,243,116 B1 | 6/2001 | Kotaki et al. |

(Continued)

FOREIGN PATENT DOCUMENTS

| | | |
|---|---|---|
| CN | 1107103 A | 8/1995 |
| CN | 102205727 A | 10/2011 |

(Continued)

OTHER PUBLICATIONS

U.S. Appl. No. 17/035,902, filed Sep. 29, 2020, Jun Ito et al.

(Continued)

*Primary Examiner* — Anh T Vo
(74) *Attorney, Agent, or Firm* — Harness, Dickey & Pierce, P.L.C.

(57) ABSTRACT

An ink jet recording apparatus includes an ink composition, an ink encasement in which the ink composition is encased, a recording head that ejects the ink composition, and a carriage configured to move the recording head back and forth. The carriage carries the ink encasement, with the ink encasement integrated with the carriage. The ink encasement has an ink fill port that opens and shuts as a port through which the ink composition is loaded. The ink composition contains a disperse colorant, with the volume-average particle diameter of the disperse colorant being 105.0 nm or less.

1 Claim, 2 Drawing Sheets

(56) References Cited

U.S. PATENT DOCUMENTS

| | | | |
|---|---|---|---|
| 6,505,923 B1 | 1/2003 | Yamamoto et al. | |
| 6,767,075 B1 | 7/2004 | Takada et al. | |
| 6,969,161 B2 | 11/2005 | Kuwabara et al. | |
| 9,067,417 B2 | 6/2015 | Komatsu et al. | |
| 2002/0140750 A1 | 10/2002 | Yoshiyama et al. | |
| 2003/0083396 A1 | 5/2003 | Ylitalo et al. | |
| 2005/0012798 A1* | 1/2005 | Adachi | C09D 11/322 347/100 |
| 2006/0203055 A1 | 9/2006 | Doi | |
| 2007/0146454 A1 | 6/2007 | Doi et al. | |
| 2007/0188571 A1* | 8/2007 | Tokita | B41M 5/0017 347/100 |
| 2007/0263054 A1 | 11/2007 | Yatake et al. | |
| 2010/0068389 A1 | 3/2010 | Ohzeki et al. | |
| 2010/0302326 A1 | 12/2010 | Morohoshi et al. | |
| 2011/0228629 A1 | 9/2011 | Kawate | |
| 2011/0242206 A1* | 10/2011 | Komatsu | B41J 2/16552 347/29 |
| 2012/0249667 A1* | 10/2012 | Hirata | C09D 11/40 347/20 |
| 2012/0293590 A1 | 11/2012 | Yoshida et al. | |
| 2013/0044168 A1 | 2/2013 | Kaga et al. | |
| 2013/0114084 A1 | 5/2013 | Kamiyanagi et al. | |
| 2013/0155160 A1 | 6/2013 | Shiono | |
| 2013/0182057 A1 | 7/2013 | Koase | |
| 2014/0036010 A1* | 2/2014 | Hasegawa | B41J 2/01 347/86 |
| 2014/0084578 A1 | 3/2014 | Yagi et al. | |
| 2014/0125743 A1 | 5/2014 | Aruga | |
| 2014/0240391 A1 | 8/2014 | Goto et al. | |
| 2015/0085034 A1 | 3/2015 | Aruga et al. | |
| 2016/0040022 A1 | 2/2016 | Aruga et al. | |
| 2016/0177116 A1 | 6/2016 | Katsuragi et al. | |
| 2016/0333211 A1 | 11/2016 | Miyajima | |
| 2018/0187034 A1 | 7/2018 | Takeno et al. | |
| 2018/0215160 A1 | 8/2018 | Koike et al. | |
| 2019/0023926 A1 | 1/2019 | Kumamoto et al. | |
| 2019/0105903 A1 | 4/2019 | Kimura et al. | |
| 2020/0207136 A1 | 7/2020 | Miyasa et al. | |
| 2020/0361220 A1 | 11/2020 | Kumagai et al. | |

FOREIGN PATENT DOCUMENTS

| | | |
|---|---|---|
| CN | 102794992 A | 11/2012 |
| CN | 103173059 A | 6/2013 |
| CN | 103804992 A | 5/2014 |
| CN | 104245860 A | 12/2014 |
| JP | 2019-019220 A | 2/2019 |
| JP | 2019-069550 A | 5/2019 |

OTHER PUBLICATIONS

U.S. Appl. No. 17/035,965, filed Sep. 29, 2020, Tomoki Maruyama et al.

U.S. Appl. No. 17/035,965, filed Sep. 29, 2020, Tomohiro Aruga et al.

U.S. Appl. No. 17/035,012, filed Sep. 29, 2020, Yusuke Miutaki et al.

* cited by examiner

INK JET RECORDING APPARATUS, INK JET RECORDING METHOD, AND INK COMPOSITION

The present application is based on, and claims priority from JP Application Serial Number 2019-179753, filed Sep. 30, 2019, the disclosure of which is hereby incorporated by reference herein in its entirety.

BACKGROUND

1. Technical Field

The present disclosure relates to an ink jet recording apparatus, an ink jet recording method, and an ink composition.

2. Related Art

In the field of relatively small ink jet recording apparatuses, such as those for household and office use, there is a demand for increasing the capacity of an ink encasement from which ink is supplied to a recording head and for reducing the overall body size.

Known serial ink jet recording apparatuses use a cartridge, which is of small capacity, or an ink tank, which provides a larger capacity, as a container from which an ink composition is supplied to a recording head. A cartridge is a container that is mounted on a carriage (mechanism that moves a recording head back and forth) together with a recording head, and the user can detach the cartridge from the carriage and attach it again. Cartridges, however, require frequent replacement because of their small capacity.

To address this, JP-A-2019-019220, for example, proposes a large-capacity ink tank. Increasing the capacity of an ink tank helps reduce the frequency of replacement and refilling.

A large ink tank, however, is difficult to mount on a carriage. Instead, it supplies the ink composition therein to a recording head through a tube or similar pathway. Increasing the capacity of an ink tank admittedly helps reduce the frequency of refilling, but at the same time can cause the chemical makeup of the ink to alter as a result of accumulated changes caused by, for example, the evaporation of water due to reduced refilling. The altered chemical makeup is difficult to bring back to the initial state, even by refilling.

Even when a freshly prepared ink composition contains well-dispersed dispersible components, alterations over time can cause the dispersible components, e.g., a disperse colorant, to precipitate, occasionally resulting in mottling.

SUMMARY

A form of an ink jet recording apparatus according to an aspect of the present disclosure includes an ink composition, an ink encasement in which the ink composition is encased, a recording head that ejects the ink composition, and a carriage configured to move the recording head back and forth. The carriage carries the ink encasement, with the ink encasement integrated with the carriage. The ink encasement has an ink fill port that opens and shuts as a port through which the ink composition is loaded. The ink composition contains a disperse colorant, with a volume-average particle diameter of the disperse colorant being 105.0 nm or less.

In the above form of an ink jet recording apparatus, a disperse colorant content of the ink composition may be 2.0% by mass or more and 7.0% by mass or less of a total amount of the ink composition.

In any of the above forms of ink jet recording apparatuses, a disperse colorant content of the ink composition may be 4.0% by mass or more and 7.0% by mass or less of a total amount of the ink composition.

In any of the above forms of ink jet recording apparatuses, the disperse colorant may be a self-dispersible colorant.

In any of the above forms of ink jet recording apparatuses, the ink composition may contain at least one organic solvent. A percentage of organic solvents with an SP of less than 16.0 may be less than 18.0% by mass of a total amount of the ink composition, and an amount of organic solvents with an SP of 16.0 or more may be ½ or less by mass of an amount of organic solvents with an SP of less than 16.0.

In any of the above forms of ink jet recording apparatuses, a static surface tension at 23° C. of the ink composition may be 25 mN/s or more and 50 mN/s or less.

In any of the above forms of ink jet recording apparatuses, the carriage may further carry a water-soluble-dye ink encasement, in which a water-soluble-dye ink composition is encased, as an extra ink encasement, and the recording head may eject the water-soluble-dye ink composition and the ink composition.

A form of an ink composition according to an aspect of the present disclosure contains a disperse colorant having a volume-average particle diameter of 105.0 nm or less. The ink composition is for use with an ink jet recording apparatus that includes an ink encasement in which the ink composition is encased, a recording head that ejects the ink composition, and a carriage configured to move the recording head back and forth. The carriage carries the ink encasement, with the ink encasement integrated with the carriage. The ink encasement has an ink fill port that opens and shuts as a port through which the ink composition is loaded.

A form of an ink jet recording method according to an aspect of the present disclosure is a recording method in which an ink jet recording apparatus is used that includes an ink composition, an ink encasement in which the ink composition is encased, a recording head that ejects the ink composition, and a carriage configured to move the recording head back and forth. The carriage carries the ink encasement, with the ink encasement integrated with the carriage. The ink encasement has an ink fill port that opens and shuts as a port through which the ink composition is loaded. The ink composition contains a disperse colorant having a volume-average particle diameter of 105.0 nm or less. The method includes ejecting the ink composition from the recording head to attach the ink composition to a recording medium.

DESCRIPTION OF EXEMPLARY EMBODIMENTS

The following describes embodiments of the present disclosure. The following embodiments are descriptions of examples of the disclosure. The disclosure is never limited to these embodiments and includes variations implemented within the gist of the disclosure. Not all the configurations described below are essential for the disclosure.

1. Ink Jet Recording Apparatus

An ink jet recording apparatus according to this embodiment includes an ink composition, an ink encasement in which the ink composition is encased, a recording head that ejects the ink composition, and a carriage configured to move the recording head back and forth.

1.1. Ink Composition

As a component of the ink jet recording apparatus according to this embodiment, the ink composition contains a disperse colorant. The volume-average particle diameter of the disperse colorant is 105.0 nm or less.

1.1.1. Disperse Colorant

Disperse colorants are colorants insoluble in solvents, such as pigments and disperse dyes. Any pigment or dye insoluble or sparingly soluble in solvents can be used. Examples include inorganic pigments, organic pigments, solvent dyes, and disperse dyes. The color of the pigment or dye is not critical either. The color of the pigment or dye may be what is called a process color, such as cyan, magenta, yellow, or black, or may be what is called a spot color, such as white, a fluorescent color, or a glitter color.

Examples of inorganic pigments that can be used include carbon black (C.I. Pigment Black 7) pigments, such as furnace black, lamp black, acetylene black, and channel black, iron oxide, titanium oxide, zinc oxide, and silica.

Examples of carbon black pigments include Mitsubishi Chemical Corporation's No. 2300, 900, MCF88, No. 20B, No. 33, No. 40, No. 45, No. 52, MA7, MA8, MA100, and No. 2200B. Other examples include Degussa's Color Black FW1, FW2, FW2V, FW18, FW200, S150, S160, and S170, Printex 35, U, V, and 140U, and Special Black 6, 5, 4A, 4, and 250, Columbian Carbon's Conductex SC and Raven 1255, 5750, 5250, 5000, 3500, 1255, and 700, Cabot's REGAL 400R, 330R, and 660R, MOGUL L, MONARCH 700, 800, 880, 900, 1000, 1100, 1300, and 1400, and ELFTEX 12, and Orient Chemical Industries Co., Ltd.'s BONJET BLACK CW-1, CW-1S, CW-2, CW-3, and M-800.

Examples of organic pigments include quinacridone pigments, quinacridone quinone pigments, dioxazine pigments, phthalocyanine pigments, anthrapyrimidine pigments, anthanthrone pigments, indanthrone pigments, flavanthrone pigments, perylene pigments, diketopyrrolopyrrole pigments, perinone pigments, quinophthalone pigments, anthraquinone pigments, thioindigo pigments, benzimidazolone pigments, isoindolinone pigments, azomethine pigments, and azo pigments.

Examples of cyan pigments include C.I. Pigment Blue 1, 2, 3, 15:3, 15:4, 15:34, 16, 22, and 60 and C.I. Vat Blue 4 and 60. An example of a preferred cyan pigment is one or a mixture of two or more selected from the group consisting of C.I. Pigment Blue 15:3, 15:4, and 60.

Examples of magenta pigments include C.I. Pigment Red 5, 7, 12, 48 (Ca), 48 (Mn), 57 (Ca), 57:1, 112, 122, 123, 168, 184, and 202 and C.I. Pigment Violet 19. An example of a preferred magenta pigment is one or a mixture of two or more selected from the group consisting of C.I. Pigment Red 122, 202, and 209 and C.I. Pigment Violet 19.

Examples of yellow pigments include C.I. Pigment Yellow 1, 2, 3, 12, 13, 14C, 16, 17, 73, 74, 75, 83, 93, 95, 97, 98, 119, 110, 114, 128, 129, 138, 150, 151, 154, 155, 180, and 185. An example of a preferred yellow pigment is one or a mixture of two or more selected from the group consisting of C.I. Pigment Yellow 74, 109, 110, 128, and 138.

An orange pigment can be, for example, C.I. Pigment Orange 36 or 43. A mixture of them can also be used. In an aqueous green ink for ink jet recording, a pigment can be C.I. Pigment Green 7 or 36, and a mixture of them can also be used.

A glitter pigment can be any kind of pigment that can glitter on a medium. Examples include metal particles, which are particles of one, or an alloy of two or more, selected from the group consisting of aluminum, silver, gold, platinum, nickel, chromium, tin, zinc, indium, titanium, and copper (alloys also referred to as metallic pigments), and pearl pigments, which have a pearly gloss. Typical examples of pearl pigments include pigments having a pearlescent or interference gloss, such as titanium dioxide-coated mica, pearl essence, and bismuth oxychloride. Glitter pigments that have been surface-treated to be inert with water can also be used.

Examples of white pigments include metal compounds, such as metal oxides, barium sulfate, and calcium carbonate. Examples of metal oxides include titanium dioxide, zinc oxide, silica, alumina, and magnesium oxide. Hollow particles can also be used as a white pigment.

A disperse or solvent dye can be any kind of colorant that does not dissolve but disperses in the ink vehicle. Examples include azo dyes, metal complex azo dyes, anthraquinone dyes, phthalocyanine dyes, and triarylmethane dyes.

Examples of disperse dyes include C.I. Disperse Red 60, 82, 86, 86:1, 167:1, and 279, C.I. Disperse Yellow 64, 71, 86, 114, 153, 233, and 245, C.I. Disperse Blue 27, 60, 73, 77, 77:1, 87, 257, and 367, C.I. Disperse Violet 26, 33, 36, and 57, and C.I. Disperse Orange 30, 41, and 61.

The pigments and dyes listed above are merely examples. One or two or more such pigments or dyes may be used, or even a combination of pigment(s) and dye(s) may be used.

Preferably, the disperse colorant reaches stable dispersion in the ink. For example, a pigment may be rendered self-dispersible through a surface treatment of the pigment particles, such as surface oxidation or sulfonation, with ozone, hypochlorous acid, fuming sulfuric acid, etc. Alternatively, a polymeric dispersant may be used.

The use of a self-dispersible colorant helps further reduce the possibility of the ink composition forming aggregates at a gas-liquid interface, for example inside the ink encasement. Self-dispersible colorants, moreover, tend to produce a strong color even with a small particle diameter.

1.1.2. Particle Diameter of the Disperse Colorant

The disperse colorant in the ink composition as a component of the ink jet recording apparatus according to this embodiment has an average particle diameter on a volume basis (D50) (also referred to as "volume-average particle diameter) of 105.0 nm or less as measured in the ink composition. This equally applies whether one or a combination of two or more of such disperse colorants as listed above is used. Colorants obtained by pulverizing such a disperse colorant as listed above, for example using a bead mill, and dispersing the resulting powder again may also be used. It should be noted that the volume-average particle diameter as mentioned herein is that of the particles of the dispersoid in the ink composition. For example, when a resin dispersant is used to disperse the disperse colorant, the volume-average particle diameter is that of the particles coated with the resin dispersant.

Preferably, the volume-average particle diameter of the disperse colorant in the ink composition is 100.0 nm or less, more preferably 90.0 nm or less, even more preferably 80.0 nm or less. With such a volume-average diameter, the particles of the disperse colorant do not easily precipitate in the ink composition, which helps achieve stable dispersion. Such a volume-average particle diameter also helps prevent, for example, the clogging of the nozzles of the ink jet recording apparatus. The color density of the resulting image, moreover, will be quite satisfactory.

The volume-average particle diameter of the disperse colorant in the ink composition can be measured using a particle size distribution analyzer based on laser diffraction and scattering. An example of such a particle size distribution analyzer is Otsuka Electronics Co., Ltd.'s ELSZ-1000 particle size analyzer. Before measurement, the ink composition may be diluted as needed.

1.1.3. Disperse Colorant Content

Preferably, the disperse colorant content of the ink composition is 2.0% by mass or more and 7.0% by mass or less, more preferably 3.0% by mass or more and 7.0% by mass or less, even more preferably 4.0% by mass or more and 7.0% by mass or less of the total amount of the ink composition. By virtue of the small volume-average particle diameter of the disperse colorant, the ink composition according to this embodiment remains able to be stably ejected even when having a relatively high disperse colorant concentration of 7.0% by mass.

A disperse colorant content of 2.0% by mass or more helps achieve better color strength of images. A disperse colorant content of 7.0% by mass or less leads to better prevention of precipitation, thereby helping achieve more stable ejection of the ink composition. Precipitation is rare even at a relatively high disperse colorant concentration of 4.0% by mass or more and 7.0% by mass or less. In the context of precipitation control, it is more preferred that the disperse colorant content be 6.5% by mass or less, in particular 5.0% by mass or less, for the upper limit.

1.1.4. Extra Ingredients

Besides the above ingredients, the ink composition may contain (1) water, (2), an organic solvent, (3) a surfactant, and (4) other ingredients.

(1) Water

The ink composition according to this embodiment may contain water. For example, the water can be of a type from which ionic impurities have been removed to the lowest possible levels, such as deionized water, ultrafiltered water, reverse osmosis water, distilled water, or any other type of purified or ultrapure water. The use of sterilized water, for example sterilized by ultraviolet irradiation or adding hydrogen peroxide, helps control the development of bacteria and fungi when the ink composition is stored long.

Preferably, the water content is 40% by mass or more, more preferably 45% by mass or more, even more preferably 50% by mass or more of the total amount (100% by mass) of the ink composition. A water content of 40% by mass or more makes the ink composition of relatively low viscosity. As for the upper limit, the water content is preferably 90% by mass or less, more preferably 85% by mass or less, even more preferably 80% by mass or less of the total amount of the ink composition.

(2) Organic Solvent

The ink composition may contain an organic solvent. Although optional, the use of an organic solvent is an easy way to combine quick drying and stable ejection. Water-soluble organic solvents are preferred.

A function of the organic solvent is to improve the wettability of the ink composition on a recording medium and to enhance the water retention of the ink composition. Examples of organic solvents include polyhydric alcohols, esters, alkylene glycol ethers, cyclic esters, and nitrogen-containing solvents. Examples of nitrogen-containing solvents include cyclic amides and acyclic amides. Examples of acyclic amides include alkoxyalkylamides.

Examples of polyhydric alcohols include 1,2-alkanediols (e.g., alkanediols such as ethylene glycol, propylene glycol (also known as propane-1,2-diol), 1,2-butanediol, 1,2-pentanediol, 1,2-hexanediol, 1,2-heptanediol, and 1,2-octanediol) and polyols (e.g., diethylene glycol, dipropylene glycol, 1,3-propanediol, 1,3-butanediol (also known as 1,3-butylene glycol), 1,4-butanediol, 1,5-pentanediol, 1,6-hexanediol, 2-ethyl-2-methyl-1,3-propanediol, 2-methyl-2-propyl-1,3-propanediol, 2-methyl-1,3-propanediol, 2,2-dimethyl-1,3-propanediol, 3-methyl-1,3-butanediol, 2-ethyl-1,3-hexanediol, 3-methyl-1,5-pentanediol, 2-methylpentane-2,4-diol, trimethylolpropane, and glycerol).

Examples of esters include glycol monoacetates, such as ethylene glycol monomethyl ether acetate, ethylene glycol monoethyl ether acetate, ethylene glycol monobutyl ether acetate, diethylene glycol monomethyl ether acetate, diethylene glycol monoethyl ether acetate, diethylene glycol monobutyl ether acetate, propylene glycol monomethyl ether acetate, dipropylene glycol monomethyl ether acetate, and methoxybutyl acetate, and glycol diesters, such as ethylene glycol diacetate, diethylene glycol diacetate, propylene glycol diacetate, dipropylene glycol diacetate, ethylene glycol acetate propionate, ethylene glycol acetate butyrate, diethylene glycol acetate butyrate, diethylene glycol acetate propionate, diethylene glycol acetate butyrate, propylene glycol acetate propionate, propylene glycol acetate butyrate, dipropylene glycol acetate butyrate, and dipropylene glycol acetate propionate.

An alkylene glycol ether can be any monoether or diether of an alkylene glycol, preferably an alkyl ether. Specific examples include alkylene glycol monoalkyl ethers, such as ethylene glycol monomethyl ether, ethylene glycol monoethyl ether, ethylene glycol monoisopropyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, triethylene glycol monobutyl ether, tetraethylene glycol monomethyl ether, tetraethylene glycol monoethyl ether, tetraethylene glycol monobutyl ether, propylene glycol monomethyl ether, propylene glycol monoethyl ether, propylene glycol monopropyl ether, propylene glycol monobutyl ether, dipropylene glycol monomethyl ether, dipropylene glycol monoethyl ether, dipropylene glycol monopropyl ether, dipropylene glycol monobutyl ether, and tripropylene glycol monobutyl ether, and alkylene glycol dialkyl ethers, such as ethylene glycol dimethyl ether, ethylene glycol diethyl ether, ethylene glycol dibutyl ether, diethylene glycol dimethyl ether, diethylene glycol diethyl ether, diethylene glycol dibutyl ether, diethylene glycol methyl ethyl ether, diethylene glycol methyl butyl ether, triethylene glycol dimethyl ether, triethylene glycol diethyl ether, triethylene glycol dibutyl ether, triethylene glycol methyl butyl ether, tetraethylene glycol dimethyl ether, tetraethylene glycol diethyl ether, tetraethylene glycol dibutyl ether, propylene glycol dimethyl ether, propylene glycol diethyl ether, dipropylene glycol dimethyl ether, dipropylene glycol diethyl ether, and tripropylene glycol dimethyl ether.

Examples of cyclic esters include cyclic esters (lactones) such as β-propiolactone, γ-butyrolactone, δ-valerolactone, ε-caprolactone, β-butyrolactone, β-valerolactone, γ-valerolactone, β-hexanolactone, γ-hexanolactone, δ-hexanolactone, β-heptanolactone, γ-heptanolactone, δ-heptanolactone, ε-heptanolactone, γ-octanolactone, δ-octanolactone, ε-octanolactone, δ-nonalactone, ε-nonalactone, and ε-decanolactone and compounds derived from such lactones by substituting hydrogen(s) in the methylene group next to the carbonyl group with a C1 to C4 alkyl group.

Examples of alkoxyalkylamides include 3-methoxy-N,N-dimethylpropionamide, 3-methoxy-N,N-diethylpropionamide, 3-methoxy-N,N-methylethylpropionamide, 3-ethoxy-N,N-dimethylpropionamide, 3-ethoxy-N,N-diethylpropionamide, 3-ethoxy-N,N-methylethylpropionamide, 3-n-butoxy-N,N-dimethylpropionamide, 3-n-butoxy-N,N-diethylpropionamide, 3-n-butoxy-N,N-methylethylpropionamide, 3-n-propoxy-N,N-dimethylpropionamide, 3-n-propoxy-N,N-diethylpropionamide, 3-n-propoxy-N,N-methylethylpropionamide, 3-isopropoxy-N,N-dimethylpropionamide, 3-isopropoxy-N,N-diethylpropionamide, 3-isopropoxy-N,N-methylethylpropionamide, 3-tert-butoxy-N,N-dimethylpropionamide, 3-tert-butoxy-N,N-diethylpropionamide, and 3-tert-butoxy-N,N-methylethylpropionamide.

Examples of cyclic amides include lactams, such as pyrrolidones including 2-pyrrolidone, 1-methyl-2-pyrrolidone, 1-ethyl-2-pyrrolidone, 1-propyl-2-pyrrolidone, and 1-butyl-2-pyrrolidone. These are preferred in that they help resin particles, described below, form film. 2-Pyrrolidone is particularly preferred.

It is also preferred to use an alkoxyalkylamide, which is a type of acyclic amide and is represented by formula (1) below.

$$R^1-O-CH_2CH_2-(C=O)-NR^2R^3 \quad (1)$$

In formula (1) above, $R^1$ denotes a C1 to C4 alkyl group, and $R^2$ and $R^3$ each independently denote a methyl or ethyl group. The "C1 to C4 alkyl group" can be a linear or branched alkyl group. To name a few, it can be a methyl, ethyl, n-propyl, isopropyl, n-butyl, sec-butyl, isobutyl, or tert-butyl group. One compound represented by formula (1) above may be used alone, or two or more may be used as a mixture.

The ink composition may contain one such organic solvent as listed above alone or may contain two or more in combination. When the ink composition is made with organic solvent(s), the total percentage of organic solvents to the ink composition as a whole is 3.0% by mass or more and 30.0% by mass or less, preferably 5.0% by mass or more and 25.0% by mass or less, more preferably 10.0% by mass or more and 20.0% by mass or less.

When the ink composition according to this embodiment contains organic solvent(s), it is preferred that the percentage of organic solvents with an SP of less than 16.0 be less than 18.0% by mass of the total amount of the ink composition with the amount of organic solvents with an SP of 16.0 or more being ½ or less by mass of that of organic solvents with an SP of less than 16.0.

More preferably, the percentage of organic solvents with an SP of less than 16.0 is 15.0% by mass or less, even more preferably 10% by mass or less, in particular 6% by mass or less of the total amount of the ink composition. The amount of organic solvents with an SP of 16.0 or more is preferably ⅓ or less, more preferably ¼ or less, even more preferably ⅕ or less by mass of that of organic solvents with an SP of less than 16.0.

The SP, or solubility parameter, as mentioned herein is that according to Hansen's method. In Hansen's method, the SP δ is calculated from three parameters according to the following equation: $\delta^2=\delta_d^2+\delta_p^2+\delta_h^2$. $\delta_d$, $\delta_p$, and $\delta_h$ are solubility parameters for dispersion forces, dipole-dipole forces, and hydrogen-bonding forces, respectively.

The unit of measurement for the SP is $(cal/cm^3)^{1/2}$. The SP is based on the idea that "two substances alike in intermolecular interactions dissolve well in each other" and was proposed by Dr. Hansen (also referred to as HSP). Since not only can it be estimated by calculation but also it can be determined experimentally or empirically, the SPs of numerous substances are found in the literature. In this embodiment, the SP can be a value derived using Hansen-Solubility HSPiP calculation software.

Examples of organic solvents (and their SPs according to Hansen's method) include, but are not limited to, methanol (SP: 14.84), ethanol (SP: 11.8), 2-propanol (SP: 12.7), n-propyl alcohol (SP: 11.8), 1,3-butanediol (SP: 14.47), 1,2-hexanediol (SP: 12.2), butoxypropanol (SP: 8.9), dipropylene glycol (SP: 12.9), triethylene glycol (SP: 13.8), 2-ethyl-1,3-hexanediol (SP: 11.6), tetraethylene glycol (SP: 12.6), glycerol (SP: 16.5), hexane (SP: 7.45), cyclohexane (SP: 8.40), 3,5,5-trimethyl-2-cyclohexen-1-one (SP: 8.87), xylene (SP: 8.95), ethylbenzene (SP: 8.93), γ-butyrolactone (SP: 14.8), 2-pyrrolidone (γ-butyrolactam) (SP: 14.2), butyl acetate (SP: 8.70), ethyl octanoate (SP: 8.3), 3-methoxybutyl acetate (SP: 8.71), oleic acid (SP: 8.69), dodecyl acrylate (SP: 8.63), diethyl ether (SP: 7.82), ethyl propyl ether (SP: 8.8), ethylene glycol monomethyl ether (SP: 11.4), ethylene glycol monoisopropyl ether (SP: 9.2), ethylene glycol monobutyl ether (SP: 9.8), diethylene glycol monomethyl ether (SP: 10.7), diethylene glycol monobutyl ether (SP: 9.5), diethylene glycol monoisobutyl ether (SP: 8.7), diethylene glycol dimethyl ether (SP: 9.4), diethylene glycol ethyl methyl ether (SP: 8.3), diethylene glycol diethyl ether (SP: 8.1), diethylene glycol isopropyl methyl ether (SP: 7.9), diethylene glycol butyl methyl ether (SP: 8.1), diethylene glycol dibutyl ether (SP: 7.7), propylene glycol monomethyl ether (SP: 10.4), propylene glycol n-propyl ether (SP: 9.8), propylene glycol n-butyl ether (SP: 9.7), propylene glycol monophenyl ether (SP: 9.4), dipropylene glycol monomethyl ether (SP: 9.6), dipropylene glycol monoethyl ether (SP: 10.9), dipropylene glycol n-propyl ether (SP: 9.5), dipropylene glycol n-butyl ether (SP: 9.4), dipropylene glycol dimethyl ether (SP: 7.88), triethylene glycol monomethyl ether (SP: 10.5), triethylene glycol monobutyl ether (SP: 10.0), triethylene glycol dimethyl ether (SP: 8.7), triethylene glycol butyl methyl ether (SP: 8.0), tripropylene glycol monomethyl ether (SP: 9.1), tripropylene glycol n-butyl ether (SP: 9.3), tripropylene glycol dimethyl ether (SP: 7.4), tetraethylene glycol dimethyl ether (SP: 8.7), ethylene glycol monomethyl ether acetate (SP: 8.96), ethylene glycol monoethyl ether acetate (SP: 8.91), ethylene glycol monobutyl ether acetate (SP: 8.85), diethylene glycol monobutyl ether acetate (SP: 8.94), and dipropylene glycol monomethyl ether acetate (SP: 8.6).

When the percentage of organic solvents with an SP of less than 16.0 is less than 18.0% by mass of the total amount of the ink composition with the amount of organic solvents with an SP of 16.0 or more being ½ or less by mass of that of organic solvents with an SP of less than 16.0, the ink composition penetrates into a recording medium slowly. As mentioned above, the ink composition according to this embodiment is made with disperse colorant(s) having a relatively small particle diameter. The ink composition may therefore reach the inside of the recording medium so quickly that the color strength of the resulting recording is weak. The manufacturer, however, may improve the color strength by selecting appropriate organic solvent(s) and thereby ensuring that the ink composition will penetrate sluggishly and reside long on the surface of the recording medium.

(3) Surfactant

A surfactant can be of any kind, but examples include acetylene glycol surfactants, polyoxyalkylene alkyl ether surfactants, fluorosurfactants, silicone surfactants, and amphoteric surfactants. Any surfactant of such types can be used, and a combination can also be used.

Examples of commercially available surfactants that can be used include Surfynol SE, Surfynol 61, Surfynol 104, Surfynol 420, Surfynol 82, Surfynol DF110D, Surfynol 104S, Surfynol 104PG50, Surfynol 420, Surfynol 82, Surfynol MD-20, Surfynol 485, OLFINE E1004, OLFINE E4300, and OLFINE E1010 (trade names, acetylene glycol surfactants, Nissin Chemical Industry), NOIGEN ET-116B, NOIGEN DL-0415, NOIGEN ET-106A, NOIGEN DH-0300, NOIGEN YX-400, and NOIGEN EA-160 (trade names, polyoxyalkylene alkyl ether surfactants, DKS), Newcol 1006 and 1006-AL (trade names, polyoxyalkylene alkyl ether surfactants, Nippon Nyukazai Co., Ltd), BYK-348 (trade name, a silicone surfactant, BYK Japan KK), EMULGEN 1108 (trade name, a polyoxyalkylene alkyl ether, Kao Corporation), KF-6011, KF-6013, KF-6004, KF-6020, KF-6043, KF-643, KF-640, KF-351A, KF-354L, KF-945, X-22-6191, X-22-4515, KF-6015, KF-6017, and KF-6038 (trade names, polysiloxane surfactants, Shin-Etsu Silicone), and L-720, L-7002, FZ-2123, FZ-2105, L-7604, FZ-2104, FZ-2116, and FZ-2120 (trade names, polysiloxane surfactants, Dow Corning Toray).

Examples of amphoteric surfactants include alkylpyridinium salts, alkyl amino acid salts, and alkyl dimethyl betaines. An amphoteric surfactant can be, for example, a betaine surfactant represented by formula (b-1) below.

(R)$_p$—N—[L—(COOM)$_q$]$_r$ (b-1)

(In formula (b-1), R represents a hydrogen atom or alkyl, aryl, or heterocyclic group. L represents a linking group with a valency of 2 or more. M represents a hydrogen atom, an alkali metal atom, an ammonium group, a protonated organic amine or nitrogen-containing heterocyclic group, or a quaternary ammonium ion group. When being a counterion for an ammonium ion that involves the N atom in formula (b-1), M represents a non-cationic group. q represents an integer of 1 or more, and r represents an integer of 1 or more and 4 or less. p represents an integer of 0 or more and 4 or less, and p+r is 3 or 4. When p+r is 4, the nitrogen atom N is a component of a quaternary amine. When p is 2 or more, the Rs may be the same or different. When q is 2 or more, the COOMs may be the same or different. When r is 2 or more, the L-(COOM)$_q$s may be the same or different.)

Preferably, the betaine surfactant represented by formula (b-1) above is a compound represented by formula (b-2).

(R$^1$)(R$^2$)(R$^3$)N$^+$—X—COO$^-$ (b-2)

(In formula (b-2), R$^1$ to R$^3$ each independently represent a C1 to C20 alkyl group, and X represents a divalent linking group.)

Preferably, the compound represented by formula (b-2) above is the compound represented by formula (b-3) below (myristyl betaine or tetradecyl-N,N-dimethylglycine).

(n-C$_{14}$H$_{29}$)(CH$_3$)$_2$N$^+$—CH$_2$—COO$^-$ (b-3)

The surfactant content is preferably 0.01% by mass or more and 2.0% by mass or less, more preferably 0.05% by mass or more and 1.50% by mass or less, even more preferably 0.10% by mass or more and 1.20% by mass or less of the total mass of the ink composition. A surfactant content of 0.01% by mass or more helps, for example, improve ejection stability.

(4) Other Ingredients

Other ingredients that may be contained in the ink composition include pH-adjusting agents, fungicides/preservatives, chelating agents, antirusts, antimolds, antioxidants, antireductants, and drying agents.

Examples of pH-adjusting agents include urea compounds, amines, morpholines, piperazines, and aminoalcohols, such as alkanolamines. Examples of urea compounds include urea, ethylene urea, tetramethylurea, thiourea, and 1,3-dimethyl-2-imidazolidinone. An example of an amine is diethanolamine. pH-adjusting agents help, for example, retard or accelerate the dissolution of impurities from materials forming the channel through which the ink flows, thereby helping adjust the detergency of the ink composition.

Examples of fungicides/preservatives include PROXEL CRL, PROXEL BDN, PROXEL GXL, PROXEL XL2, PROXEL IB, and PROXEL TN (all are trade names; Lonza). Fungicides/preservatives help control fungal and bacterial growth, thereby improving the storage of the ink composition.

Examples of chelating agents include ethylenediaminetetraacetic acid (EDTA) and the nitrilotriacetate, hexametaphosphate, pyrophosphate, and metaphosphate of ethylenediamine.

1.1.5. Surface Tension of the Ink Composition

The static surface tension at 23° C. of the ink composition is 25 mN/s or more and 70 mN/s or less, preferably 25 mN/s or more and 50 mN/s or less, even more preferably 26 mN/s or more and 45 mN/s or less, in particular 26 mN/s or more and 40 mN/s or less. Such a static surface tension helps ensure that the rate of penetration of the ink composition into a recording medium is sufficiently sluggish. With such a static surface tension, therefore, it is easier to improve color strength by ensuring long residence of the ink composition on the surface of the recording medium.

The surface tension of the ink composition can be adjusted by, for example, changing at least one of the type(s), combination, and amount(s) of at least one of water, organic solvent(s), and surfactant(s). As for measurement, a possible method for measuring the static surface tension at 23° C. of the ink composition is to analyze a layer of the ink composition spread on a platinum plate under 23° C. conditions using CBVP-Z automated surface tensiometer (Kyowa Interface Science Co., Ltd.).

1.1.6. Use of the Ink Composition

As stated, this ink composition contains a disperse colorant, with the volume-average particle diameter of the colorant being 105.0 nm or less. This ink composition, furthermore, is for use with an ink jet recording apparatus that includes the ink composition, an ink encasement in which the ink composition is encased, a recording head that ejects the ink composition, and a carriage configured to move the recording head back and forth. The carriage carries the ink encasement, with the ink encasement integrated with the carriage. The ink encasement has an ink fill port that opens and shuts as a port through which the ink composition is loaded. The following describes an ink jet recording apparatus according to this embodiment.

1.2. Structure of the Ink Jet Recording Apparatus

An ink jet recording apparatus according to this embodiment includes an ink composition as described above. The following outlines its structure excluding the ink composition by taking an ink jet recording apparatus 1 as an example. The ink jet recording apparatus 1 includes an ink composition, an ink encasement 7 in which the ink composition is encased, a recording head 3 that ejects the ink composition, and a carriage 4 configured to move the recording head 3 back and forth. The carriage 4 carries the ink encasement 7, with the ink encasement 7 integrated with the carriage 4. The ink encasement 7 has an ink fill port 71 that opens and shuts as a port through which the ink composition is loaded. In the drawings referenced in the following description, the scale may vary from element to element so that each element is recognizable.

Figure 1:
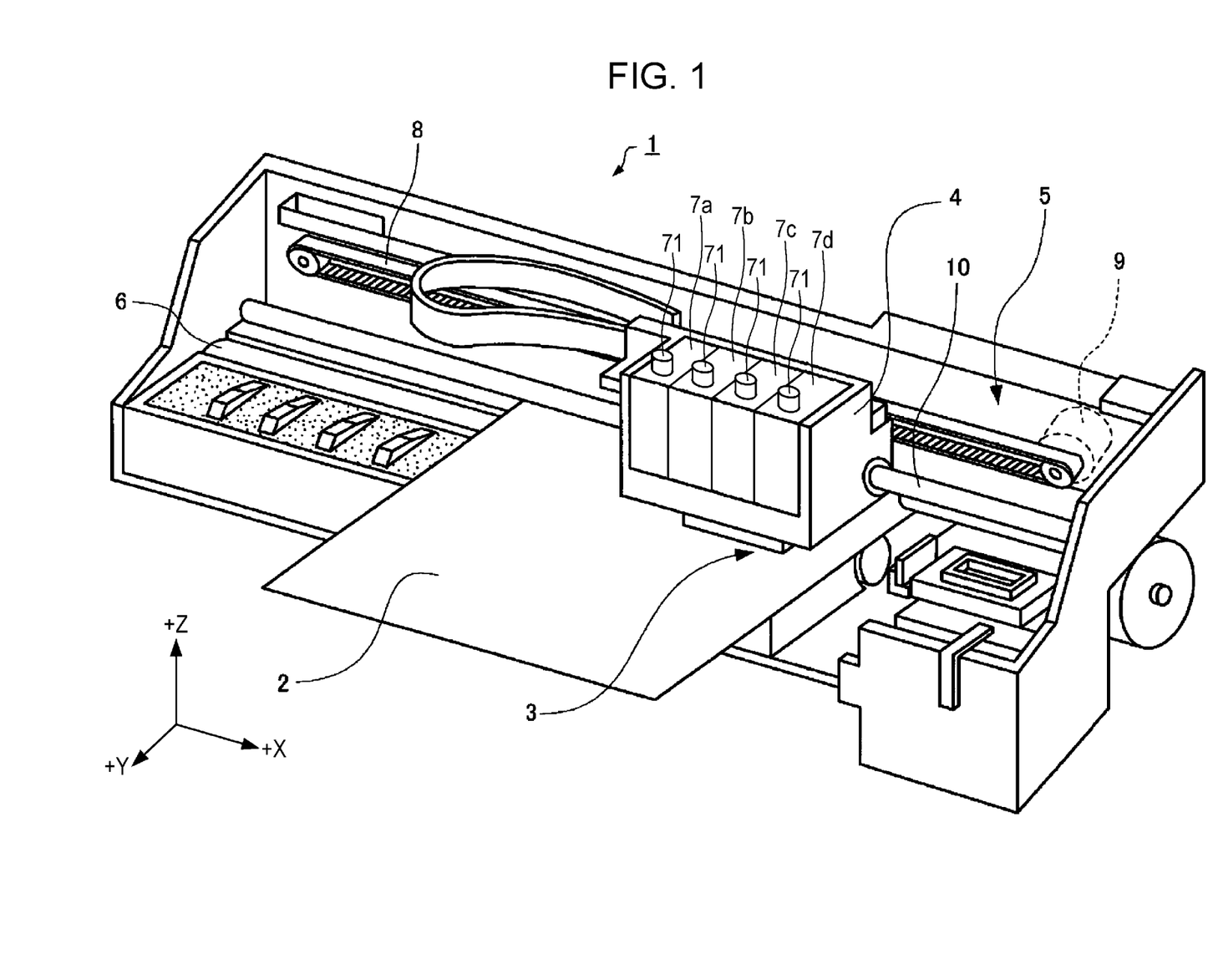
FIG. 1 is an outline perspective diagram illustrating an example of an ink jet recording apparatus according to an embodiment.

The recording head 3 is an ink composition ejector, i.e., a component that ejects tiny droplets of the ink composition. Using this recording head 3, the ink jet recording apparatus 1 attaches droplets to a recording medium 2. FIG. 1 is an outline perspective diagram illustrating the ink jet recording apparatus 1.

As illustrated in FIG. 1, the ink jet recording apparatus 1 has a recording head 3, a carriage 4, a main scanning mechanism 5, a platen roller 6, and a control unit (not illustrated) that controls the overall operation of the ink jet recording apparatus 1. The carriage 4 carries the recording head 3 and ink encasements 7a, 7b, 7c, and 7d in which ink compositions to be supplied to the recording head 3 are contained. That is, the carriage 4 moves the recording head 3 back and forth and carries ink encasements 7a, 7b, 7c, and 7d, with the ink encasements 7a, 7b, 7c, and 7d integrated with the carriage 4. The illustrated ink encasements 7a, 7b, 7c, and 7d each represent an example of an ink encasement 7.

The ink encasements 7a, 7b, 7c, and 7d are immobilized and cannot be detached from the carriage 4 by the user. That is, the carriage 4 carries an ink encasement 7 integrated therewith. The integration between the carriage 4 and the ink encasement 7 may be achieved by producing the ink encasement 7 separately from the carriage 4 and screwing, gluing with an adhesive agent, or otherwise fastening it to the carriage 4, or may be achieved by monolithically forming the carriage 4 and the ink encasement 7. With the ink encasements 7a, 7b, 7c, and 7d immobilized on the carriage 4, the user can access their ink fill port 71, which opens and shuts, to fill, refill, etc., the ink encasements 7a, 7b, 7c, and 7d with ink compositions. The details of the ink encasement 7 will be discussed later herein.

The main scanning mechanism 5 has a timing belt 8 coupled to the carriage 4, a motor 9 that drives the timing belt 8, and a guide shaft 10. The guide shaft 10 extends in the direction in which the carriage 4 moves, or in the main scanning direction, and serves as a support for the carriage 4. The carriage 4 is driven by the motor 9 via the timing belt 8 to move back and forth along the guide shaft 10. In this way, the main scanning mechanism 5 moves the carriage 4 back and forth in the main scanning direction.

The platen roller 6 transports a recording medium 2, on which a record is produced, in a sub-scanning direction perpendicular to the main scanning direction, or along the length of the recording medium 2. The recording medium 2 is therefore transported in the sub-scanning direction. The carriage 4 moves back and forth in the main scanning direction with the recording head 3 and ink encasements 7a, 7b, 7c, and 7d thereon, and the main scanning direction is substantially identical to the direction along the width of the recording medium 2. As a result, the recording head 3 moves in the main and sub-scanning directions relative to the recording medium 2.

The ink encasements 7a, 7b, 7c, and 7d are four independent ink encasements. The same or different ink compositions can be encased in the ink encasements 7a, 7b, 7c, and 7d. These ink encasements separately contain ink compositions, for example in the colors of black, cyan, magenta, and yellow, and can be used in any combination. The number of ink encasements does not need to be four as illustrated in FIG. 1. On the bottom of the ink encasements 7a, 7b, 7c, and 7d is a supply port (hidden in FIG. 1) through which the ink composition contained is supplied to the recording head 3. By virtue of integration with the carriage 4, the ink encasements 7a, 7b, 7c, and 7d, unlike cartridges, do not expose their supply port to the outside. This helps reduce contamination through the supply port, such as air entrainment.

The recording head 3 ejects ink compositions supplied from the ink encasements 7a, 7b, 7c, and 7d and attaches them to a recording medium 2 through multiple nozzles under the control of the control unit (not illustrated). On its surface facing the recording medium 2 to which the ink compositions are attached, the recording head 3 has multiple nozzles (hidden in FIG. 1) through which it ejects the ink compositions and attaches them to the recording medium 2. These multiple nozzles are lined up to form nozzle lines, and there are separate nozzle lines for ink compositions in different colors. Each ink composition is supplied from an ink encasement to the recording head 3 and ejected as droplets through the nozzles by the action of actuators (not illustrated) provided inside the recording head 3. The ejected droplets of ink compositions land on the recording medium 2, forming an image, text, a pattern, an expression of colors, etc., of the ink compositions on the recording medium 2.

The recording head 3 uses piezoelectric elements as driving actuators, but this is not the only possible mode of driving. For example, the actuators may be electromechanical transducers, which displace a diaphragm as an actuator using electrostatic attraction, or electrothermal transducers, which eject droplets of an ink composition using bubbles generated by heating.

In the X-Y-Z coordinate system illustrated in FIG. 1, the X direction is the direction in which the recording head 3 and ink encasements 7a, 7b, 7c, and 7d move (i.e., the direction in which the carriage 4 moves) and at the same time is along the width of the ink jet recording apparatus 1. The Y direction represents the direction along the depth of the ink jet recording apparatus 1 (i.e., the direction in which the recording medium 2 moves), and the Z direction represents the direction along the height of the ink jet recording apparatus 1. In FIG. 1, the +Y direction is toward the front of the ink jet recording apparatus 1, whereas the −Y direction is toward the back or rear of the ink jet recording apparatus 1. In the front view of the ink jet recording apparatus 1, the direction toward the right is the +X direction, and that toward the left is the −X direction. The +Z direction is toward the top (including the upper portion, the top surface, etc.) of the ink jet recording apparatus 1, and the −Z direction is toward the bottom (including the lower portion, the bottom surface, etc.) of the ink jet recording apparatus 1.

1.3. Ink Encasement

Figure 2:
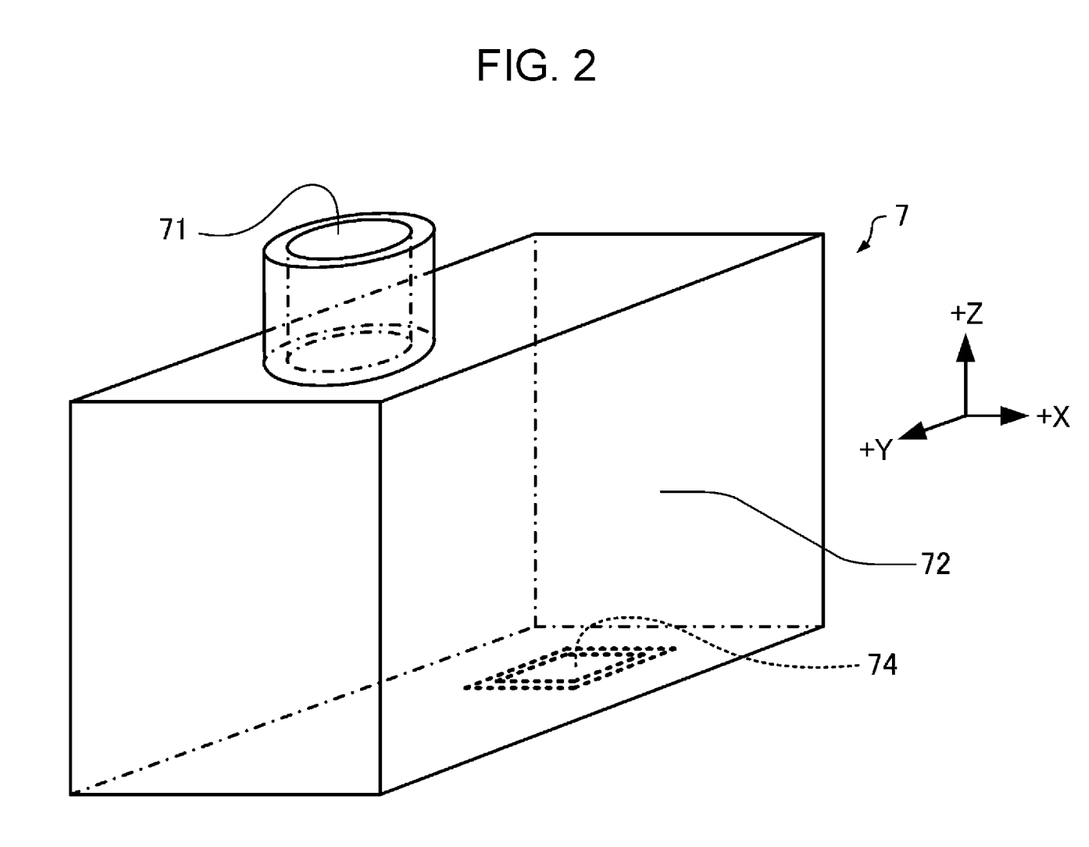
FIG. 2 is a perspective diagram schematically illustrating an ink encasement according to an embodiment.

This ink jet recording apparatus 1 has four ink encasements, ink encasements 7a, 7b, 7c, and 7d, and all of them have an ink fill port 71 that opens and shuts as a port through which an ink composition is loaded. In the following, an ink encasement 7 that can be used as any of the ink encasements 7a, 7b, 7c, and 7d is described with reference to FIG. 2. FIG. 2 is a perspective diagram schematically illustrating the ink encasement 7. In the X-Y-Z coordinate system illustrated in FIG. 2, the X direction is the direction in which the recording head 3 and ink encasement 7 move (i.e., the direction in which the carriage 4 moves).

1.3.1. Shape and Other Details of the Ink Encasement

The ink encasement 7 has at least an ink fill port 71 that opens and shuts as a port through which an ink composition is loaded. In the example illustrated in FIG. 2, the ink encasement 7 has an ink fill port 71, an encasing chamber 72, and an ink discharge port 74.

The encasing chamber 72 encases an ink composition. The encasing chamber 72 has a substantially rectangular parallelepiped shape, defined by the encasement's frame. The walls that define the encasing chamber 72 are of, for example, a shaped plastic article or film. Preferably, the walls that define the encasing chamber 72 are of polypropylene. The schematic in FIG. 2 assumes that the encasement's frame has no thickness. The encasing chamber 72 and the frame can be in any shape as long as the ink encasement 7 can encase and eject an ink composition and can be immobilized on the carriage 4. For example, the ink encasement 7 may have inside the encasing chamber 72 a component that reinforces the structural strength of its frame, such as ribs or a pillar.

The ink encasement 7 is narrow in the X direction, and the X direction is identical to the direction in which the carriage 4 moves (main scanning direction). As the carriage 4 moves, the ink encasement 7 thereon is rocked in the X direction. The width, in the X direction, of the ink encasement 7 is 1 cm or more and 10 cm or less for example, preferably 2 cm or more and 7 cm or less. When the ink encasement 7 has such a width, in the X direction, the maximum width, in the X direction, of the encasing chamber 72 can be 0.6 cm or more, preferably 1.6 cm or more.

The capacity of the encasing chamber 72 is greater than that of ordinary ink cartridges. For example, the encasing chamber 72 has a capacity of 10 mL or more and 500 mL or less, preferably 20 mL or more and 300 mL or less, more preferably 30 mL or more and 200 mL or less, even more preferably 50 mL or more and 200 mL or less.

As stated, the ink encasement 7 is rocked as the carriage 4 moves. Designing the ink encasement 7 and the encasing chamber 72 with such dimensions as given above ensures that this rocking motion shakes and stirs the encased ink composition.

The encasing chamber 72 communicates with the ink fill port 71 and the ink discharge port 74. The ink fill port 71 is an opening that communicates with the encasing chamber 72. The ink fill port 71 is above the encasing chamber 72 (up in the Z direction). The ink fill port 71 has a lid not illustrated. The lid opens and shuts and is manipulated, for example by the user, when the ink encasement 7 is refilled with the ink composition or for other needs. A check valve, which automatically opens and shuts, in a passage through which the ink composition flows cannot be the lid.

The ink discharge port 74 is an opening that communicates with the encasing chamber 72. The ink discharge port 74 is below the encasing chamber 72 (down in the Z direction). The ink discharge port 74 is an opening through which the ink composition encased in the encasing chamber 72 is discharged toward the recording head 3. The ink discharge port 74 has a filter 80, which is described later herein.

The ink composition is introduced through the ink fill port 71 into the encasing chamber 72 and discharged through the ink discharge port 74. An ink composition introduced into the encasing chamber 72 accumulates in the lower portion (down in the Z direction) by the action of the force of gravity, with a gas in the upper portion (up in the Z direction). When an ink composition is ejected from the recording head 3 in a recording job performed using the ink jet recording apparatus 1, an appropriate volume, based on the volume that should be ejected, of the ink composition is discharged through the ink discharge port 74. The ink encasement 7 may have components like an opening or valve that regulates the pressure inside its encasing chamber 72 and/or a detector that detects the amount of ink composition inside.

Preferably, the ink composition comes into contact with the material forming the encasing chamber 72 at an angle of 45° or less. More preferably, the angle of contact between the ink composition and the material forming the encasing chamber 72 is 40° or less, even more preferably 35° or less. An angle of contact of 45° or less is advantageous in that it prevents air entrainment, especially in initial loading, thereby helping avoid air bubbles in the ink composition.

1.3.2. Multiple Ink Encasements

As stated, the ink jet recording apparatus according to this embodiment may have multiple ink encasements. An ink composition as described above only needs to be encased in at least one of the multiple ink encasements. When only one or a subset of the ink encasements of the ink jet recording apparatus encase an ink composition as described above, the rest may encase, for example, an ink composition that contains a water-soluble dye, or a water-soluble-dye ink composition.

That is, the carriage 4 of the ink jet recording apparatus 1 according to this embodiment may carry a water-soluble-dye ink encasement, in which a water-soluble-dye ink composition is encased, as an extra ink encasement 7. When it does, the recording head 3 may eject the water-soluble-dye ink composition and ink composition(s) as described above.

The water-soluble-dye ink encasement is not described; it is similar to the ink encasement 7 described above. The water-soluble-dye ink composition can be as follows.

The water-soluble-dye ink composition contains a water-soluble dye. Any water-soluble dye can be contained in the water-soluble-dye ink composition. Acidic dyes, direct dyes, reactive dyes, and basic dyes can be used. Examples include C.I. Acid Yellow 17, 23, 42, 44, 79, and 142, C.I. Acid Red 52, 80, 82, 249, 254, and 289, C.I. Acid Blue 9, 45, and 249, C.I. Acid Black 1, 2, 24, and 94, C.I. Food Black 1 and 2, C.I. Direct Yellow 1, 12, 24, 33, 50, 55, 58, 86, 132, 142, 144, and 173, C.I. Direct Red 1, 4, 9, 80, 81, 132, 225, and 227, C.I. Direct Blue 1, 2, 15, 71, 86, 87, 98, 165, 199, and 202, C.I. Direct Black 19, 38, 51, 71, 154, 168, 171, and 195, C.I. Reactive Red 14, 32, 55, 79, 141, and 249, and C.I. Reactive Black 3, 4, and 35.

Other examples include at least one selected from the compound represented by formula (y-1) below or its salt

(In formula (y-1), each of the four sulfonic acid groups may independently be in the sulfonate form. Examples of counterions in a salt of the compound represented by formula (y-1) include the hydrogen (proton), lithium, sodium, potassium, and ammonium ions, and the counterion may be of the same or different species between the four sulfonic acid groups), the compound represented by formula (y-2) below or its salt

(In formula (y-2), each of the four carboxy groups may independently be in the carboxylate form. Examples of counterions in a salt of the compound represented by formula (y-2) include the hydrogen (proton), lithium, sodium, potassium, and ammonium ions, and the counterion may be of the same or different species between the four carboxy groups), the compound represented by formula (y-3) below or its salt (In formula (y-3), each of the four carboxy groups may independently be in the carboxylate form. Examples of counterions in a salt of the compound represented by formula (y-3) include the hydrogen (proton), lithium, sodium, potassium, and ammonium ions, and the counterion may be of the same or different species between the four carboxy groups), the compound represented by formula (y-4) below or its salt, (y-4)

the compound represented by formula (y-5) below or its salt, (y-5)

the compound represented by formula (m-1) below or its salt (m-1)

(Examples of counterions in a salt of the compound represented by formula (m-1) include the hydrogen (proton), lithium, sodium, potassium, and ammonium ions, and the counterion may be of the same or different species between the four carboxy and two sulfonic acid groups), the compound represented by formula (m-2) below or its salt being an acylamino group represented by formula (m-3') below. Z represents a $SO_3H$, $SO_3M$ (where M represents an ammonium ion or alkali metal ion), or sulfamoyl group. n represents an integer of 0 to 3 when at least one of $R^2$, $R^3$, $R^4$, $R^7$, $R^8$, and $R^9$ is substituted with an ionic group, and an integer of 1 to 3 when not. Z, when present, is in place of at least one aromatic hydrogen atom.)

(m-2)

(Examples of counterions in a salt of the compound represented by formula (m-2) include the hydrogen (proton), lithium, sodium, potassium, and ammonium ions, and the counterion may be of the same or different species between the four carboxy and six sulfonic acid groups), a compound represented by formula (m-3) below or its salt

(m-3')

(m-3)

(In formula (m-3'), $R^{11}$ represents an alkyl, cycloalkyl, aryl, arylalkyl, alkenyl, or heterocyclic group. The alkyl, cycloalkyl, aryl, arylalkyl, alkenyl, or heterocyclic group may have at least one type of substituent selected from the group of substituents consisting of the alkyl, aryl, arylalkyl, alkenyl, alkoxy, cyano, alkylamino, sulfoalkyl, carbamoyl, sulfamoyl, and sulfonylamino groups, halogens, and ionic groups. * represents a site for binding with the aromatic ring in formula (m-3).) (Examples of counterions in a salt of a compound represented by formula (m-3) include the hydrogen (proton), lithium, sodium, potassium, and ammonium ions), the compound represented by formula (m-4) below or its salt (m-4)

(In formula (m-3), $R^1$, $R^5$, $R^6$, and $R^{10}$ each independently represent an alkyl group. $R^3$ and $R^8$ each independently represent a hydrogen atom or alkyl, alkoxy, or aryloxy group. An alkyl, alkoxy, or aryloxy group may have at least one type of substituent selected from the group of substituents consisting of the alkyl, aryl, arylalkyl, hydroxyl, carbamoyl, sulfamoyl, alkoxy, and cyano groups, halogens, and ionic groups. $R^2$, $R^4$, $R^7$, and $R^9$ each independently represent a hydrogen atom or an acylamino group represented by formula (m-3') below, with at least one of $R^2$, $R^4$, $R^7$, and $R^9$ (Examples of counterions in a salt of the compound represented by formula (m-4) include the hydrogen (proton), lithium, sodium, potassium, and ammonium ions, and the counterion may be of the same or different species between the four sulfonic acid groups), a compound represented by formula (m-5) below or its salt

(m-5)

(In formula (m-5), $n_1$ is 1 or 2, each of the three Ms is sodium or ammonium, the three Ms may be the same or different, and $R^0$ is a C1 to C8 monoalkylamino group substituted with a carboxy group), a compound represented by formula (c-1) below or its salt different.) (Examples of counterions in a salt of a compound represented by formula (c-1) include the hydrogen (proton), lithium, sodium, potassium, and ammonium ions, and the counterion may be of the same or different species between the sulfonic acid groups), the compound represented by formula (c-2) below or its salt (c-2)

$R = \text{—}SO_2(CH_2)_3SO_3H$ (c-1)

(In formula (c-1), $0 \leq b \leq 4$, $0 \leq c \leq 4$, and $1 \leq (b+c) \leq 4$, where $b+c$ is an integer. Rings $A^1$, $A^2$, and $A^3$ are each selected from the benzene, 2,3-pyridine, and 3,2-pyridine rings, with at least one of rings $A^1$, $A^2$, and $A^3$ being a 2,3-pyridine or 3,2-pyridine ring. Rings $A^1$, $A^2$, and $A^3$ may be the same or (Examples of counterions in a salt of the compound represented by formula (c-2) include the hydrogen (proton), lithium, sodium, potassium, and ammonium ions, and the counterion may be of the same or different species between the four sulfonic groups), the compound represented by formula (c-3) below or its salt (c-3)

R = —SO₂(CH₂)₃SO₃H/—SO₂(CH₂)₃SO₂NHCH₂CH(OH)CH₃
[2/2]

(Examples of counterions in a salt of the compound represented by formula (c-3) include the hydrogen (proton), lithium, sodium, potassium, and ammonium ions, and the counterion may be of the same or different species between the two sulfonic acid groups), a compound represented by formula (c-4) below or its salt substituents of type(s) selected from the group consisting of the sulfonic acid, carboxy, phosphono, sulfamoyl, carbamoyl, hydroxy, alkoxy, amino, alkylamino, dialkylamino, arylamino, diarylamino, acetylamino, ureido, alkyl, nitro, and cyano groups, halogens, and alkylsulfonyl and alkylthio groups. Y is a hydroxy or amino group. $1.0 \le a \le 2.0$, $0.0 \le b \le 3.0$, $0.1 \le c \le 3.0$, and $1.0 \le a+b+c \le 4.0$.) (Examples of counterions in a salt of a compound represented by formula (c-4) include the hydrogen (proton), lithium, sodium, potassium, and ammonium ions), the compound represented by formula (c-5) below or its salt (c-5)

Z1 = Z2 = Z3 = —(CH₂)₃SO₃H
Z4 = —(CH₂)₃SO₂NHCH₂CH(OH)CH₃

(c-4)

(In formula (c-4), each of rings A, B, C, and D is independently an aromatic six-membered ring, with at least one of rings A, B, C, and D being a pyridine or pyrazine ring. E is an alkylene group. X is a sulfo-, carboxy-, or phosphono-substituted anilino group that may further have one to four (Examples of counterions in a salt of the compound represented by formula (c-5) include the hydrogen (proton), lithium, sodium, potassium, and ammonium ions, and the counterion may be of the same or different species between the three sulfonic acid groups), and a compound represented by formula (c-6) or its salt (In formula (c-6), rings $A^1$, $A^2$, and $A^3$ are each selected from the benzene, 2,3-pyridine, and 3,2-pyridine rings, with at least one of rings $A^1$, $A^2$, and $A^3$ being a 2,3-pyridine or 3,2-pyridine ring, and rings $A^1$, $A^2$, and $A^3$ may be the same or different. $1.0 \le a \le 3.0$, $0.2 \le b \le 1.8$, $0.8 \le c \le 1.6$, and $0 \le a+b+c \le 4$. $1 \le x \le 3$, where x is an integer. $R^1$ is a C1 to C6 linear alkylene group).

One such water-soluble dye may be used alone, or two or more may be used in combination.

Preferably, the total water-soluble dye content is 1% by mass or more and 20% by mass or less of the total mass (100% by mass) of the water-soluble-dye ink composition. The water-soluble-dye ink composition may be a clear composition (clear ink), which is colorant-free or contains so small an amount of colorant that the purpose of its use is no longer coloring (e.g., 0.1% by mass or less).

Besides the water-soluble dye, the water-soluble-dye ink composition can contain water, an organic solvent, a surfactant, and other ingredients. These ingredients are not described; they are as described in the above Ink Composition section.

When the ink jet recording apparatus 1 carries a water-soluble-dye ink encasement, in which a water-soluble-dye ink composition is encased, as an extra ink encasement 7 on its carriage 4 and ejects the water-soluble-dye ink composition and an ink composition as described above from its recording head 3, the following advantages are obtained.

In a disperse-colorant ink composition, what makes the colorant disperse is an electrostatic action. Mixing it with a dye ink, which has a relatively high ionic concentration, can therefore break the dispersion of the colorant and cause the colorant to aggregate. When one recording head ejects a disperse-colorant ink and a water-soluble-dye ink, for example, the two inks can mix together even without direct contact, for example due to mixing of mists. The mixture forms aggregates, which can cause poor ejection and other defects by adhering to the nozzle plate. Furthermore, when the ink jet recording apparatus 1 has a suction cap, a tool for ink flushing and other purposes, sucking the disperse-colorant and water-soluble-dye inks at the same time can cause the colorant to aggregate in the cap. The aggregates produced can accumulate in the cap.

When the ink jet recording apparatus 1 carries a water-soluble-dye ink encasement and a disperse-colorant ink composition as described above on its carriage 4, the disperse-colorant and water-soluble-dye ink compositions can touch each other. As stated, however, the disperse colorant in the disperse-colorant ink composition has a small particle diameter. This helps reduce the amount of aggregate that forms upon contact between the two inks and, when the recording apparatus 1 has a suction cap, also helps reduce accumulation in the suction cap, even when the water-soluble-dye ink composition is used in the same recording head 3 as the disperse-colorant ink composition and ejected from a different line of nozzles.

2. Ink Jet Recording Method

An ink jet recording method according to this embodiment is a recording method in which an ink jet recording apparatus as described above is used. The ink jet recording apparatus therefore includes an ink composition, an ink encasement in which the ink composition is encased, a recording head that ejects the ink composition, and a carriage configured to move the recording head back and forth. The carriage carries the ink encasement, with the ink encasement integrated with the carriage. The ink encasement has an ink fill port that opens and shuts as a port through which the ink composition is loaded. The ink composition contains a disperse colorant, with the volume-average particle diameter of the disperse colorant being 105.0 nm or less. The method includes ejecting the ink composition from the recording head to attach the ink composition to a recording medium.

The recording medium can be of any kind. It may have a recording surface that absorbs the ink composition or may have no such recording surface. Any kind of recording medium can therefore be used. Examples include paper, film, cloth, metal, glass, and polymers.

3. Examples and Comparative Examples

The following describes an aspect of the present disclosure in detail by providing examples, but no aspect of the disclosure is limited to these Examples. In the following, "parts" and "%" are by mass unless stated otherwise.

3.1. Preparation of Ink Compositions

Table 1 summarizes the formulae of the ink compositions of Examples and Comparative Examples. Each ink composition was prepared by mixing the ingredients specified in Table 1, stirring them for 30 minutes or longer, and filtering the mixture. The mixing of the ingredients was by adding the materials one by one to a container equipped with a mechanical stirrer and then stirring and mixing the materials. The resulting mixture was filtered to complete the ink composition of the Example or Comparative Example (Examples 1 to 11 and Comparative Examples 1 to 5). In Table 1, the numerical values representing the amounts of ingredients are in the unit of % by mass.

TABLE 1

|  |  | Examples | | | | | | | | |
|---|---|---|---|---|---|---|---|---|---|---|
|  |  | 1 | 2 | 3 | 4 | 5 | 6 | 7 | 8 | 9 |
| Encasement position | | ON | ON | ON | ON | ON | ON | ON | ON | ON |
| Self-dispersible colorant (1) | | 4.0 | 3.0 | 6.5 | — | — | — | 4.0 | — | 4.0 |
| Self-dispersible colorant (2) | | — | — | — | 4.0 | 2.0 | 5.0 | — | 2.0 | — |
| Self-dispersible colorant (3) | | — | — | — | — | — | — | — | — | — |
| Resin-dispersed colorant (1) | | — | — | — | — | — | — | — | — | — |
| Resin-dispersed colorant (2) | | — | — | — | — | — | — | — | — | — |
| Glycerol | | 5.0 | 5.0 | 5.0 | 5.0 | 5.0 | 5.0 | 5.0 | 4.0 | 6.0 |
| 1,2-Hexanediol | | 3.0 | 3.0 | 3.0 | 3.0 | 3.0 | 3.0 | 5.0 | 1.0 | 3.0 |
| 2-Pyrrolidone | | 7.0 | 7.0 | 7.0 | 7.0 | 7.0 | 7.0 | 7.0 | 7.0 | 7.0 |
| OLFINE E1010 | | 1.0 | 1.0 | 1.0 | 1.0 | 1.0 | 1.0 | 5.0 | 1.0 | 1.0 |
| Water | | Balance | Balance | Balance | Balance | Balance | Balance | Balance | Balance | Balance |
| Ink composition characteristics | Volume-average particle diameter (nm) | 80.0 | 80.0 | 80.0 | 105.0 | 105.0 | 105.0 | 80.0 | 105.0 | 80.0 |
|  | Surface tension (mN/s) | 28.0 | 28.0 | 28.0 | 28.0 | 28.0 | 28.0 | 45.0 | 26.0 | 28.0 |
| Test results | Precipitation | A | A | B | A | A | B | A | A | A |
|  | Aggregation potential | A | A | A | B | B | B | B | B | A |
|  | Image quality | A | B | A | A | B | A | B | A | B |

|  |  | Examples | | Comparative Examples | | | | |
|---|---|---|---|---|---|---|---|---|
|  |  | 10 | 11 | 1 | 2 | 3 | 4 | 5 |
| Encasement position | | ON | ON | ON | ON | ON | OFF | OFF |
| Self-dispersible colorant (1) | | — | 5.0 | — | — | — | 4.0 | 5.0 |
| Self-dispersible colorant (2) | | — | — | — | — | — | — | — |
| Self-dispersible colorant (3) | | — | — | 5.0 | — | — | — | — |
| Resin-dispersed colorant (1) | | 4.0 | — | — | — | — | — | — |
| Resin-dispersed colorant (2) | | — | — | — | 5.0 | 3.0 | — | — |
| Glycerol | | 5.0 | 4.0 | 5.0 | 5.0 | 5.0 | 5.0 | 4.0 |
| 1,2-Hexanediol | | 3.0 | 0.0 | 3.0 | 3.0 | 3.0 | 3.0 | 0.0 |
| 2-Pyrrolidone | | 7.0 | 7.0 | 7.0 | 7.0 | 7.0 | 7.0 | 7.0 |
| OLFINE E1010 | | 1.0 | 1.0 | 1.0 | 1.0 | 1.0 | 1.0 | 1.0 |
| Water | | Balance | Balance | Balance | Balance | Balance | Balance | Balance |
| Ink composition characteristics | Volume-average particle diameter (nm) | 105.0 | 80.0 | 120.0 | 150.0 | 150.0 | 80.0 | 80.0 |
|  | Surface tension (mN/s) | 28.0 | 28.0 | 28.0 | 28.0 | 28.0 | 28.0 | 28.0 |
| Test results | Precipitation | B | B | D | D | C | C | C |
|  | Aggregation potential | B | A | B | C | C | A | A |
|  | Image quality | B | A | B | B | B | A | A |

The ingredients in Table 1 were as follows.
Self-dispersible colorant (1): Carbon black (Orient Chemical Industries Co., Ltd.'s CW-1)
Self-dispersible colorant (2): Carbon black (Orient Chemical Industries Co., Ltd.'s CW-3)
Self-dispersible colorant (3): Carbon black (Orient Chemical Industries Co., Ltd.'s CW-2)
Resin-dispersed colorant (1): C.I. Pigment Red 122 was dispersed using a resin as follows.
Resin-dispersed colorant (2): C.I. Pigment Yellow 74 was dispersed using a resin as follows.
Glycerol: SP according to Hansen's method=16.5
1,2-Hexanediol: SP according to Hansen's method=12.2
2-Pyrrolidone: SP according to Hansen's method=14.2
OLFINE E1010: SP according to Hansen's method=10.14 (trade name, an acetylene glycol surfactant, Nissin Chemical Industry)
Preparation of Resin-Dispersed Colorants (1) and (2)
The following materials were put into a fully nitrogen-purged reactor, and polymerization was initiated at 75° C. with stirring: 20 parts by mass of organic solvent (methyl ethyl ketone), 0.03 parts by mass of chain transfer agent (2-mercaptoethanol), a polymerization initiator, 15 parts by mass of polypropylene glycol monomethacrylate (9 propylene oxide groups), 15 parts by mass of poly(ethylene glycol-propylene glycol) monomethacrylate (7 propylene oxide groups and 5 ethylene oxide groups), 12 parts by mass of methacrylic acid, 50 parts by mass of styrene monomer, 10 parts by mass of styrene macromer, and 10 parts by mass of benzyl methacrylate. To the resulting mixture, a solution of 0.9 parts by mass of 2,2'-azobis(2,4-dimethylvaleronitrile) in 40 parts by mass of methyl ethyl ketone, both per 100 parts by mass of the monomer components, was added. The resulting mixture was aged at 80° C. for 1 hour to give a polymer solution.

Then 7.5 parts by mass of the resulting water-insoluble polymer was dissolved in 45 parts by mass of methyl ethyl ketone. A predetermined amount of a 20% aqueous solution of sodium hydroxide (neutralizing agent) was added to neutralize salt-forming groups. Using a bead mill, the resulting mixture was kneaded with 20 parts by mass of C.I.

Pigment Red 122 for 2 hours. The resulting paste was stirred with 120 parts by mass of deionized water, methyl ethyl ketone was removed at 6° C. under reduced pressure, and part of water was removed. This gave a liquid dispersion of resin-coated pigment with a solids concentration of 20% by mass, resin-dispersed colorant (1).

The same process was repeated with C.I. Pigment Yellow 74 instead of C.I. Pigment Red 122. This gave another liquid dispersion of resin-coated pigment with a solids concentration of 20% by mass, resin-dispersed colorant (2). In the Table, the amounts of colorants are on a solids basis.

Table 1 also includes the position of the ink encasement used in testing. "ON" refers to "on carriage," which means the ink encasement was mounted on a carriage as in the above embodiment. "OFF" refers to "off carriage," which means the ink encasement was not mounted on a carriage. In this case the ink encasement was attached to the body of a recording apparatus, and the ink composition therein was supplied to a recording head on a carriage through a tube.

In each Example or Comparative Example, the ink composition was diluted with purified water by a factor of 10, and the volume-average particle diameter (D50) (nm) of the colorant was measured using Otsuka Electronics Co., Ltd.'s ELSZ-1000 particle size analyzer. The static surface tension (mN/s) at 23° C. was also measured, by analyzing a layer of the ink composition spread on a platinum plate under 23° C. conditions using CBVP-Z automated surface tensiometer (Kyowa Interface Science Co., Ltd.). Table 1 also includes these characteristics. Although not presented in the table, the ink compositions of the Examples all came into contact at an angle of 40° or less with the inner wall of the ink tank used in the testing described below.

3.2. Testing

The ink compositions of the Examples and Comparative Examples were tested as follows.

3.2.1. Precipitation

For the "on carriage" configuration (Examples 1 to 11 and Comparative Examples 1 to 3), the test equipment was a modified version of Seiko Epson Corporation's PX-S170T. A polypropylene ink encasement was integrated with PX-S170T's carriage in such a manner that the ink composition could be sampled through an ink fill port. For the "off carriage" configuration (Comparative Examples 4 and 5), the test equipment was Seiko Epson Corporation's EW-M770T. EW-M770T has ink encasements on its body, and ink compositions therein are transported to a recording head on the carriage through a tube.

The ink of the Example or Comparative Example was loaded into the ink encasement (or one of the ink encasements) of the test equipment and left in that state. Six months later, the carriage was moved back and forth 20 times, the ink composition was sampled from near the bottom of the ink encasement, and the absorbance of the sample was measured using a spectrophotometer. The percentage change in absorbance from baseline was calculated according to the equation below, and precipitation was graded according to the criteria below. The results are presented in Table 1. Grade A or B indicates that the ink composition benefited advantages of an aspect of the present disclosure.

Percentage change in absorbance={(Absorbance at 6 months/Absorbance at baseline)−1}×100

Grading Criteria

A: The percentage change in absorbance is less than 1%.
B: The percentage change in absorbance is 1% or more and less than 3%.
C: The percentage change in absorbance is 3% or more and less than 5%.
D: The percentage change in absorbance is 5% or more.

3.2.2. Aggregation Potential

To evaluate the aggregation potential, the ink composition of each Example or Comparative Example was mixed with a water-soluble-dye ink composition, and the change in the diameter of dispersed particles was monitored. The formula of the water-soluble-dye ink composition was as follows: C.I. Direct Yellow 86, 3.0% by mass; glycerol, 10.0% by mass; 1,2-hexanediol, 3.0% by mass; OLFINE E1010, 1.0% by mass; purified water, balance.

The measuring instrument was Otsuka Electronics Co., Ltd.'s ELSZ-1000 particle size analyzer.

Equal volumes of the ink composition of the Example or Comparative Example and the water-soluble-dye ink composition were mixed together, the mixture was put into a quartz cell, and the cell was subjected to the measurement of volume-average particle diameter. The percentage change in particle diameter from before to after mixing was calculated for each Example or Comparative Example, and the aggregation potential was graded according to the criteria below. The results are presented in Table 1.

A: The percentage change in particle diameter is less than 200%.
B: The percentage change in particle diameter is 200% or more and less than 300%.
C: The percentage change in particle diameter is 300% or more.

3.2.3. Image Quality

The ink composition of each Example or Comparative Example was used to record a solid image on ordinary printing paper. The printer assigned to the Example or Comparative Example was used with its default settings. The optical density (OD) of a solid-image portion was measured using i1 color profiler (X-rite), and image quality was graded according to the criteria below. The results are presented in Table 1.

A: The OD is 1.25 or more.
B: The OD is 1.15 or more and less than 1.25.
C: The OD is less than 1.15.

3.3. Test Results

The Examples were ink jet recording apparatuses that included an ink composition, an ink encasement in which the ink composition was encased, a recording head that was to eject the ink composition, and a carriage configured to move the recording head back and forth. The ink composition contained a disperse colorant, with the volume-average particle diameter of the disperse colorant being 105.0 nm or less. The carriage carried the ink encasement, with the ink encasement integrated with the carriage. The ink encasement had an ink fill port that opens and shuts as a port through which the ink composition was to be loaded. As shown in Table 1, in the Examples, the precipitation of the disperse colorant in the ink composition was limited.

The present disclosure is not limited to the above embodiments, and many variations are possible. For example, the present disclosure embraces configurations substantially identical to those described in the embodiments (e.g., configurations identical in function, methodology, and results to or having the same goal and offering the same advantages as the described ones). The present disclosure also includes configurations created by changing any nonessential part of those described in the above embodiments. Furthermore, the present disclosure encompasses configurations identical in operation and effect to or capable of fulfilling the same purposes as those described in the above embodiments.

Configurations obtained by adding any known technology to those described in the embodiments are also part of the present disclosure.

What is claimed is:

1. An ink jet recording apparatus comprising:
an ink composition, the ink composition containing at least one organic solvent, with a percentage of organic solvents with an SP of less than 16.0 being less than 18.0% by mass of a total amount of the ink composition, and an amount of organic solvents with an SP of 16.0 or more being ½ or less by mass of an amount of organic solvents with an SP of less than 16.0;
an ink encasement in which the ink composition is encased;
a recording head that ejects the ink composition; and
a carriage configured to move the recording head back and forth, wherein:
the carriage carries the ink encasement, with the ink encasement integrated with the carriage;
the ink encasement has an ink fill port that opens and shuts as a port through which the ink composition is loaded; and
the ink composition contains a disperse colorant, with a volume-average particle diameter of the disperse colorant being 105.0 nm or less.

* * * * *